(12) United States Patent
Wan et al.

(10) Patent No.: US 12,466,035 B2
(45) Date of Patent: Nov. 11, 2025

(54) FIXTURE AND METHOD OF CLAMPING A PLURALITY OF FRAME-SHAPED WORKPIECES

(71) Applicant: ABB SCHWEIZ AG, Baden (CH)

(72) Inventors: Haoxu Wan, Shanghai (CN); Hao Yang, Shanxi (CN); Zhijun Chen, Zhejiang (CN); Zhizheng Wang, Shanghai (CN); Yi Ding, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/635,572

(22) Filed: Apr. 15, 2024

(65) Prior Publication Data

US 2024/0253188 A1 Aug. 1, 2024

Related U.S. Application Data

(63) Continuation of application No. PCT/CN2021/128737, filed on Nov. 4, 2021.

(51) Int. Cl.
*B25B 5/14* (2006.01)
*B23Q 3/06* (2006.01)

(52) U.S. Cl.
CPC .............. *B25B 5/145* (2013.01); *B23Q 3/061* (2013.01)

(58) Field of Classification Search
CPC .......... B25B 11/00; B23Q 3/062; B23Q 3/061
See application file for complete search history.

(56) References Cited

U.S. PATENT DOCUMENTS

| 4,397,598 A * | 8/1983 | Ess ........................ B27B 27/02 198/456 |
| 5,375,492 A * | 12/1994 | Smitterberg ............. B26D 7/32 83/13 |
| 8,366,946 B2 * | 2/2013 | Ferguson ............. B25B 11/002 206/706 |
| 10,383,350 B2 * | 8/2019 | McCormick ......... A21C 15/002 |
| 2003/0140512 A1 * | 7/2003 | Jevons .................... B25B 5/142 33/481 |

(Continued)

FOREIGN PATENT DOCUMENTS

| CN | 105643403 A | 6/2016 |
| CN | 207358615 U * | 5/2018 |

(Continued)

OTHER PUBLICATIONS

CN-209350113-U machine translation (Year: 2019).*

(Continued)

*Primary Examiner* — Michael W Hotchkiss
(74) *Attorney, Agent, or Firm* — GREENBERG TRAURIG, LLP (57) ABSTRACT

A fixture and a method for clamping a plurality of frame-shaped workpieces. The fixture includes a plurality of clamping members adapted to be alternately stacked with the plurality of frame-shaped workpieces along a stacking direction; the plurality of clamping members having positioning holes aligned to each other in the stacking direction; and a locking assembly at least partially arranged in the positioning holes and adapted to press the plurality of clamping members in the stacking direction to allow the plurality of clamping members to be clamped in position.

7 Claims, 5 Drawing Sheets

(56) References Cited

U.S. PATENT DOCUMENTS

| | | | | |
|---|---|---|---|---|
| 2009/0261519 A1* | 10/2009 | Piggott | ................... | B25B 5/145 |
| | | | | 29/423 |
| 2016/0152003 A1* | 6/2016 | Peng | ................... | B32B 38/0036 |
| | | | | 156/580 |
| 2017/0282319 A1 | 10/2017 | Habel et al. | | |
| 2018/0044123 A1* | 2/2018 | Omiya | ................... | B65G 57/00 |

FOREIGN PATENT DOCUMENTS

| | | | | |
|---|---|---|---|---|
| CN | 209350113 U | * | 9/2019 | |
| CN | 209613324 U | * | 11/2019 | |
| CN | 209998792 U | * | 1/2020 | |
| CN | 111002166 A | | 4/2020 | |
| CN | 210474404 U | | 5/2020 | |
| CN | 111843715 A | | 10/2020 | |
| CN | 211940033 U | | 11/2020 | |
| CN | 213255517 U | * | 5/2021 | |
| CN | 213727314 U | | 7/2021 | |
| KR | 101595343 B1 | * | 4/2016 | |
| WO | WO-2014125767 A1 | * | 8/2014 | ............. B65G 57/00 |

OTHER PUBLICATIONS

CN-209998792-U machine translation (Year: 2020).*
KR101595343B1 machine translation (Year: 2016).*
WO-2014125767-A1 machine translation (Year: 2014).*
CN-207358615-U Machine Translation (Year: 2018).*
CN-209613324-U Machine Translation (Year: 2019).*
CN-213255517-U Machine Translation (Year: 2021).*

* cited by examiner

FIXTURE AND METHOD OF CLAMPING A PLURALITY OF FRAME-SHAPED WORKPIECES

CROSS-REFERENCE TO RELATED APPLICATIONS

This is a continuation application claiming priority to international patent application Serial No.: PCT/CN2021/128737, filed on Nov. 4, 2021; which is herein incorporated by reference in its entirety.

FIELD

Embodiments of the present disclosure generally relate to a fixture and a method of clamping a plurality of frame-shaped workpieces.

BACKGROUND

With the advancement and development of technology, industrial robots are increasingly used in a variety of industries and applications. They come in a wide range of models with the reach distance, payload capacity and the number of axes of travel (up to six) of their jointed arm being the most common distinguishing characteristics. In both production and handling applications, a robot utilizes an end effector or end of arm tooling (EOAT) attachment to hold and manipulate either the tool performing the process, or the piece upon which a process is being performed.

For the processing of some workpieces such as frame-shaped workpieces, due to the constraints of fixtures and other factors, a robot can usually only process one workpiece at a time. This leads to low processing efficiency.

SUMMARY

Embodiments of the present disclosure provide a fixture and a method for clamping a plurality of frame-shaped workpieces.

In a first aspect, a fixture for clamping a plurality of frame-shaped workpieces is provided. The fixture comprises a plurality of clamping members adapted to be alternately stacked with the plurality of frame-shaped workpieces in a stacking direction; a plurality of positioning holes formed through the plurality of clamping members and aligned to each other in the stacking direction; and a locking assembly at least partially arranged in the plurality of positioning holes and adapted to press the plurality of clamping members in the stacking direction to allow the plurality of clamping members to be clamped in position.

With the fixture according to embodiments of the present disclosure, a plurality of frame-shaped workpieces can be processed, e.g., ground, at a time, to thereby significantly improve the process efficiency. Furthermore, the grinding tools can be used effectively. In addition, the processing consistency and quality of the workpieces are improved.

In some embodiments, the plurality of clamping members comprise at least one intermediate clamping member comprising a spacing plate adapted to space apart adjacent two of the plurality of frame-shaped workpieces; and a pair of limiting protrusions protruding from two opposite sides of the spacing plate in the stacking direction and adapted to be arranged inside one of the plurality of frame-shaped workpieces to limit movement of the frame-shaped workpiece. In this way, the workpieces can be clamped in position in a simple way.

In some embodiments, the plurality of clamping members further comprise a pair of end clamping members arranged at two ends of the stacked clamping members in the stacking direction, and each comprising an end plate; and an end limiting protrusion protruding from a side of the end plate in the stacking direction to limit movement of the frame-shaped workpiece. In this way, two types of the clamping members are provided, i.e., the end clamping members and the intermediate clamping members arranged between the end clamping members. On the one hand, this avoids waste of materials. On the other hand, the stacked clamping members and workpieces can be operated by a robot more easily.

In some embodiments, the locking assembly comprises a locking pole adapted to pass through the plurality of positioning holes; and a fastener coupled to an end of the locking pole to allow the plurality of clamping members to be pressed. This allows the stacked workpieces can be clamped in a simple way.

In some embodiments, the fixture further comprises a plurality of guiding holes arranged in pairs through the plurality of clamping members and adapted for a pair of guiding poles to pass through. This arrangement can facilitate the alternately stacking of the clamping members and workpieces and can provide pre-alignment of the stacked workpieces in the stacking direction.

In some embodiments, the fixture further comprises a limiting gauge with an L-shape and adapted to abut against two sides of the plurality of frame-shaped workpieces to align the plurality of frame-shaped workpieces in the stacking direction. In this way, the stacked workpieces can be ensured to be aligned to each other in a simple way.

In a second aspect, a method of clamping a plurality of frame-shaped workpieces is provided. The method comprises causing an end effector of a robot to alternately stack the plurality of frame-shaped workpieces and a plurality of clamping members; and causing the end effector to move the plurality of stacked workpieces or to operate a locking assembly so that the locking assembly is at least partially arranged in the plurality of positioning holes and presses the plurality of clamping members in the stacking direction to allow the plurality of clamping members to be fixed in position.

In some embodiments, causing the end effector to move the plurality of stacked workpieces or to operate the locking assembly comprises: causing the end effector to move the plurality of stacked workpieces or to operate the locking assembly so that a locking pole of the locking assembly passes through a plurality of positioning holes; and causing the end effector to couple a fastener to the locking pole to clamp the plurality of clamping members in position.

In some embodiments, the method further comprises causing the end effector to allow a pair of guiding poles to pass through a plurality of guiding holes arranged in pairs through the plurality of clamping members.

In some embodiments, alternately stacking the plurality of frame-shaped workpieces and the plurality of clamping members further comprises: causing the end effector to alternately operate the plurality of frame-shaped workpieces and the plurality of clamping members to allow a pair of guiding poles to pass through a plurality of guiding holes arranged in pairs through the plurality of clamping members.

In some embodiments, the method further comprises, before the plurality of stacked workpieces are fixed: causing the end effector to move a limiting gauge with an L-shape to abut against two sides of the plurality of frame-shaped workpieces to align the plurality of frame-shaped workpieces in the stacking direction.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent the same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

For the machining process of some workpieces, especially frame-shaped workpieces, typically, the fixture for the machining process can only clamp one workpiece stably. A robot or an operator can only process one clamped workpiece at a time. This leads to low processing efficiency. The frame-shaped workpiece herein refers to a workpiece only having a frame without a bottom and/or a top or with a bottom and/or a top having one or more through holes. The frame-shaped workpiece is a common workpiece in the manufacturing process, and is usually used as a housing or structural part of a device.

Usually, side surfaces of the frame-shaped workpiece typically need to be ground to obtain a better surface effect. Currently, to improve the grinding efficiency and quality, the frame-shaped workpiece is typically ground using a robot. Before being ground or polished, one frame-shaped workpiece is fixed on a worktable by using a fixture. Then the robot controls with one or more grinding tools to move around the clamped frame-shaped workpiece to grind and/or polish the side surfaces of the frame-shaped workpiece.

To obtain a required grinding quality, multiple grinding tools with different particle sizes are typically used one after another. On the one hand, because only one workpiece is ground at a time, the grinding efficiency is relatively low even a robot is used. On the other hand, since the frame-shaped workpiece having a relatively small height compared to a height of a grinding tool, only a small part of the grinding tool is frequently used with other parts being rarely used or not used at all during the grinding. After repeated grinding of the workpieces, the frequently used part of the grinding tool will fail, causing the entire grinding tool cannot be used with some parts thereof being not used at all. This leads to a huge waste of grinding tools.

In order to at least partially address the above and other potential problems, embodiments of the present disclosure provide a fixture for clamping a plurality of frame-shaped workpieces. With the fixture according to embodiments of the present disclosure, a robot can grind a plurality of workpiece at a time, leading to a significantly improved grinding efficiency.

Figure 1:
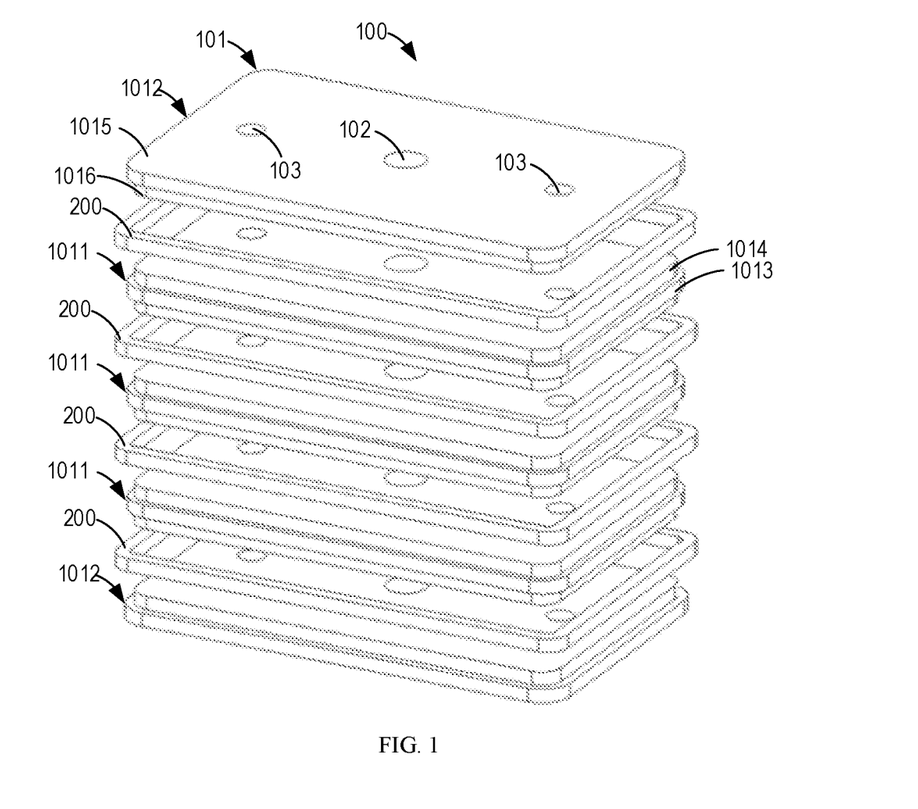
FIG. 1 shows an exploded view of a plurality of clamping members and workpieces to be clamped therebetween according to embodiments of the present disclosure.
Figure 2:
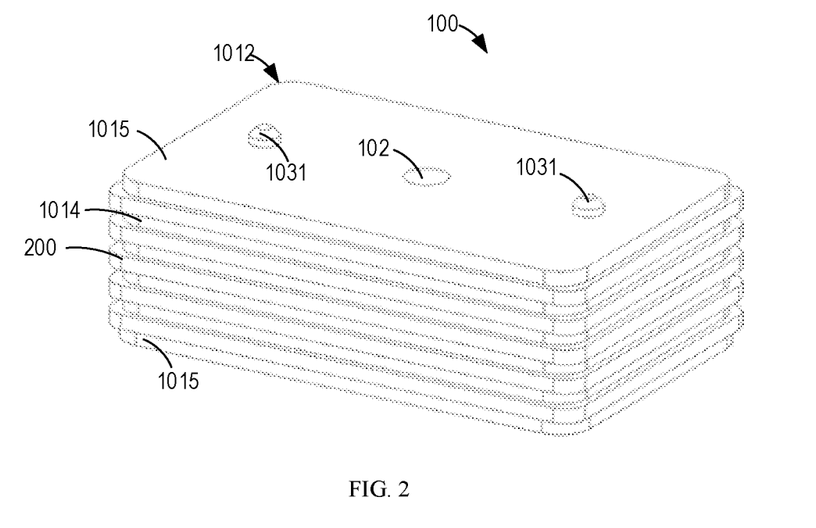
FIG. 2 shows a perspective view of alternately stacking of clamping members and workpieces according to embodiments of the present disclosure.

In the followings, some example structures of the fixture 100 according to embodiments of the present disclosure will be discussed with reference to FIGS. 1-6. FIG. 1 shows an exploded view of the fixture 100 with a plurality of workpieces to be clamped. As shown in FIG. 1, generally, the fixture 100 comprises a plurality of clamping members 101. The plurality of clamping members 101 are stacked alternately with the plurality of frame-shaped workpieces 200 in a stacking direction.

In some embodiments, the clamping members 101 may all have the same structure. For example, in some embodiments, each of the clamping members 101 may be called as intermediate clamping members 1011, each of which comprises a spacing plate 1013 and a pair of limiting protrusions 1014 protruding from two opposite sides of the spacing plate 1013. The spacing plate 1013 is used to space adjacent two frame-shaped workpieces 200 apart.

In some embodiments, the spacing plate 1013 may have a size smaller than an outer size and larger than an inner size of the workpiece to be clamped in transvers directions. The transverse directions herein refer to direction perpendicular to the stacking direction. The outer size of the frame-shaped workpiece in the transvers directions refers to a size of the outer periphery of the frame of the workpiece, e.g., including a length and a width of the outer periphery. The outer periphery of the workpiece comprises the side surfaces to be ground. The inner size of the frame-shaped workpiece in the transvers directions refers to a size of the inner periphery of the frame or the workpiece in the transverse directions. The difference between the outer size and the inner size of the workpiece in the transvers directions is a thickness of the frame of the workpiece.

By setting the size of the spacing plate 1013 between the outer size and the inner size of the workpiece, the spacing plate 1013 allows the outer periphery of workpieces 200 to be arranged outside relative to the spacing plate 1013 in transverse directions. In this way, the fixture 100 according to embodiments of the present application will not hinder the grinding of the side surfaces of the workpiece.

The limiting protrusions 1014 of the clamping member 101 are arranged inside one of the plurality of the frame-shaped workpiece to limit movement of the workpiece at least in the transverse directions. In some embodiments, the limiting protrusion 1014 has a size slightly smaller than the inner size of the workpiece in the transverse directions. In this way, on the one hand, the limiting protrusions 1014 can be easily arranged inside the frame-shaped workpiece. On the other hand, after the limiting protrusions 1014 are arranged inside the workpiece, slight movements of the workpieces are allowed in the transverse directions before being finally clamped, to thereby facilitate adjustment of the alignment in the stacking direction.

It is to be understood that the above embodiments where the limiting protrusion 1014 has a size slightly smaller than the inner size of the workpiece are merely illustrative, without suggesting any limitation as to the scope of the present disclosure. Any other suitable structure and arrangement are also possible as long as they facilitate alignment and clamping of the workpieces 200. For example, in some alternative embodiments, the limiting protrusion 1014 is tapered and the largest size thereof is equal to the inner size of the workpiece.

For a size of the limiting protrusion 1014 in the stacking direction, i.e., a height of the limiting protrusion 1014, it may be smaller than a half of a height of the frame-shaped workpiece. In this way, the limiting protrusions 1014 of two clamping members 101 adjacent to a workpiece 200 can be arranged inside the workpiece 200 with upper and lower surfaces of the workpiece or at least parts thereof are close to or in contact with the spacing plates 1013. This can prevent the movement of the workpieces 200 in the stacking direction.

In some embodiments, the limiting protrusions 1014 may be solid or hollow and may protrude outward across the entire span in the transverse directions. For example, in some embodiments, they may be integrally formed with the spacing plate 1013 for example by molding. In some alternative embodiments, the limiting protrusions 1014 may also be separately formed and fixed to the spacing plate 1013 for example by welding or suitable fasteners.

It is to be understood that the above embodiments where the limiting protrusions 1014 protrude outward across the entire span in the transverse directions are merely illustrative, without suggesting any limitation as to the scope of the present disclosure. Any suitable structure or arrangement is also possible. For example, in some alternative embodiments, the limiting protrusions 1014 may only have protruding edges. That is, the limiting protrusions 1014 only partially protrude. In comparison to the limiting protrusions 1014 protruding outward across the entire span in the transverse directions, only edges of the limiting protrusion 1014 protrude and inner parts inside the edges do not protrude or only partially protrude from the spacing plate 1013. This arrangement can further reduce the weight of the clamping members 101.

With the clamping members 101 having the same structure, all of the clamping member 101 can be modularly designed and manufactured, thereby reducing costs. In addition, when the workpieces 200 are clamped, there is no need to distinguish the front and back or the order of the clamping members 101, thereby further improving the clamping efficiency. It is to be understood that for the clamping members 101 having the same structure, the clamping members 101 arranged at two ends of the stacked clamping members 101 in the stacking direction each have a limiting portion that is not arranged inside the workpiece.

In some embodiments, the clamping members 101 may also have different structures. For example, besides the intermediate clamping members 1011 as mentioned above, the clamping members 101 may further comprise a pair of end clamping members 1012. The end clamping members 1012 is adapted to be arranged at ends of the stacked clamping members 101 in the stacking direction during the clamping. Different from the intermediate clamping members 1011, the end clamping member 1012 has one end limiting protrusion 1016 protruding from an end plate 1015 in the stacking direction. The end plate 1015 may have the same specification as the spacing plate 1013 as mentioned above. In this way, the clamping members 101 may have two types, i.e., a pair of end clamping members 1012 and at least one intermediate clamping member 1011 adapted to be arranged between the end clamping members 1012.

The clamping members 101 and the workpieces 200 may be stacked one by one manually or by a robot to achieve the alternately stacking of the clamping members 101 and the workpieces 200. To facilitate the alternately stacking of the workpieces 200 and the clamping members 101, in some embodiments, the fixture 100 may further comprise a plurality of guiding holes 103, as shown in FIG. 1. For example, each of the clamping members 101 may be provided with a pair of guiding holes 103. The plurality of guiding holes 103 may be arranged in pairs through the clamping members 101 and adapted for a pair of guiding poles 1031 to pass through. The guiding poles 1031 passing through the guiding holes 103 may provide pre-alignment of the workpieces 200 and the clamping members 101 in the stacking direction.

For example, in some embodiments, the pair of guiding poles 1031 may be arranged on the worktable where the workpieces 200 is to be ground. Then the clamping members 101 and the workpieces 200 may be operated alternately to allow the guiding poles 1031 to pass through the guiding holes 103 so that every adjacent two clamping members 101 clamp one workpiece.

In some alternative embodiments, the pair of guiding poles 1031 may also be arranged at any suitable positions other than the worktable. For example, in some embodiments, the guiding poles 1031 may be arranged on a moveable plate. After the clamping members 101 and workpieces 200 have been stacked alternately through the guiding poles 1031, they can then be moved to the worktable with the moveable plate having the guiding poles 1031. In some embodiments, after the clamping members 101 and workpieces 200 have been stacked alternately, they may also be removed together from the guiding poles 1031 and moved to the worktable where they will be ground while keep the alternately stacking of the clamping members 101 and workpieces 200.

In some alternative embodiments, the pair of guiding poles 1031 may also be arranged on one of the end clamping members 1012. The end clamping member 1012 with the guiding poles 1031 may be firstly placed to a certain position and then the other clamping members 101 and workpieces 200 can be operated alternately to allow the guiding poles 1031 to pass though the guiding holes 103 of the other clamping members 101. After that, the clamped workpieces 200 may then be moved to the worktable where they will be ground. In some embodiments, the end clamping member 1012 with the guiding poles 1031 may also be directly placed on the worktable before other clamping members 101 and workpieces 200 is stacked thereon.

It is to be understood that the above embodiments where a pair of guiding poles 1031 are used are merely illustrative, without suggesting any limitation as to the scope of the present disclosure. Any suitable arrangement or structure is also possible. For example, in some alternative embodiments, there may also be three or more guiding poles 1031. Correspondingly, the number of the guiding holes 103 in each clamping member 101 may also be adjusted to be the same as or more than the number of the guiding poles 1031.

Figure 3:
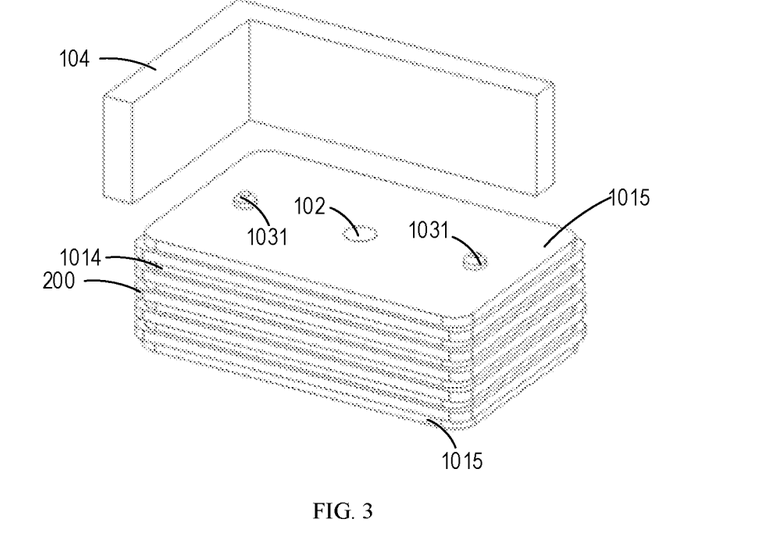
FIG. 3 shows a perspective view of alternately stacking of clamping members and workpieces with a limiting gauge according to embodiments of the present disclosure.
Figure 4:
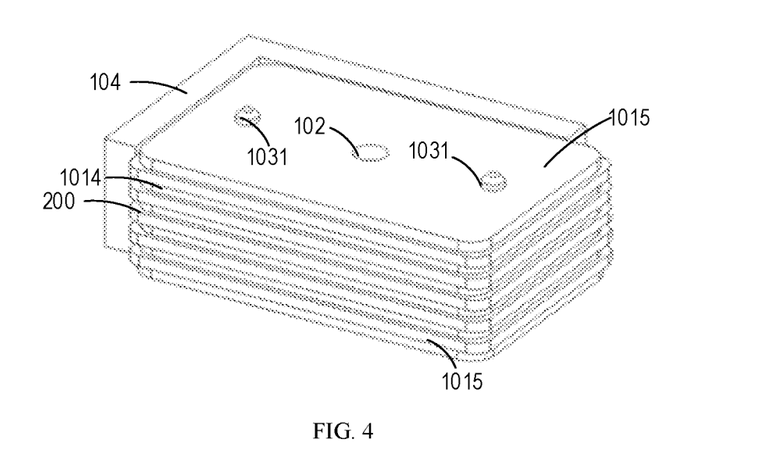
FIG. 4 shows a perspective view of alternately stacking of clamping members and workpieces which are aligned with a limiting gauge according to embodiments of the present disclosure.
Figure 5:
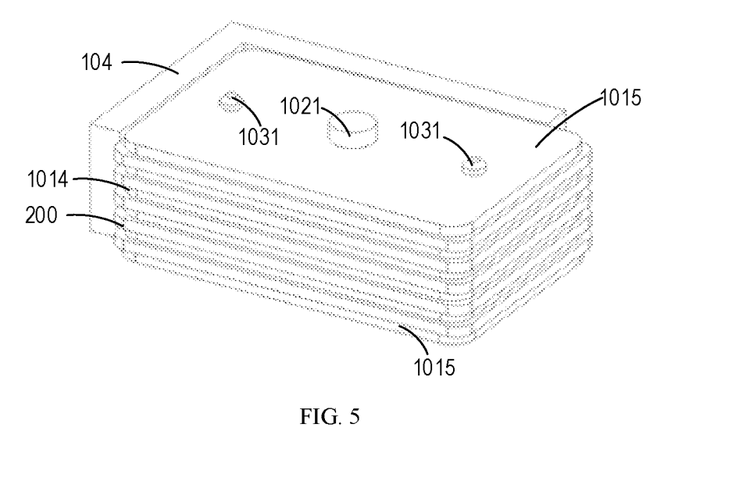
FIG. 5 shows a perspective view of a locking pole passing through alternately stacking of clamping members and workpieces which are aligned with a limiting gauge according to embodiments of the present disclosure.
Figure 6:
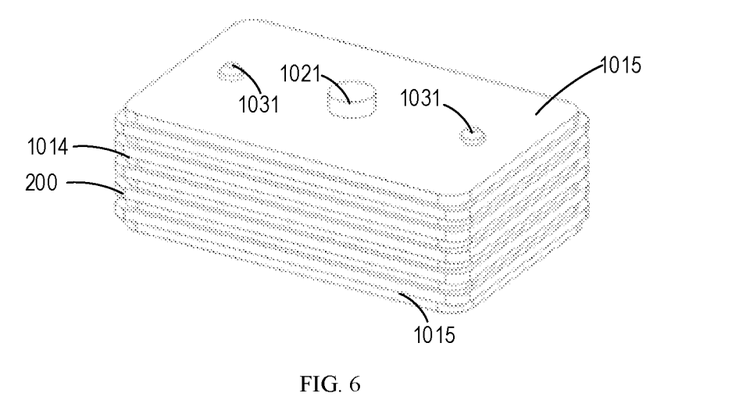
FIG. 6 shows a perspective view of alternately stacking of clamping members and workpieces which are clamped and ready for processing according to embodiments of the present disclosure.

To facilitate the alignment of the workpieces 200 in the stacking direction, in some embodiments, the fixture 100 may further comprise a limiting gauge 104, as shown in FIG. 3. The limiting gauge 104 may comprise two planner plates and typically have an L-shape formed by the two planner plates. The two planner plates may be integrally formed or separately formed and assembled together. After the clamping members 101 and the workpieces 200 are stacked alternately in the stacking direction, the limiting gauge 104 may be used to abut against two sides of the frame-shaped workpieces 200, as shown in FIG. 4. The limiting gauge 104 may have a height in the stacking direction larger than or equal to the distance between two workpieces 200 arranged at ends of the stacked workpieces 200 in the stacking direction. In this way, with the abutting of the limiting gauge 104, the workpieces 200 may be aligned to each other in the stacking direction.

In some embodiments, the limiting gauge 104 may be a part of an end effector of a robot for operating the fixture 100 and workpieces 200. For example, after the end effector has alternately stacked the clamping members 101 and the workpieces 200, the robot may then operate the limiting gauge 104 to abut against the two sides of the stacked workpieces 200 to align the workpieces 200.

It is to be understood that the above embodiments where the limiting gauge 104 is a part of the end effector are merely illustrative, without suggesting any limitation as to the scope of the present disclosure. Any other suitable arrangement is also possible. For example, in some alternative embodiments, the limiting gauge 104 may also be separated from the end effector of a robot but can be operated by the end effector to align the workpieces 200.

After the clamping members 101 and the workpieces 200 are stacked alternately and aligned to each other in the stacking direction, as shown in FIG. 4, they need to be clamped or pressed in the stacking direction to fix the workpiece in position. To achieve this, the fixture 100 according to embodiments of the present disclosure further comprises a plurality of positioning holes 102 formed through the clamping members 101 and a locking assembly at least partially arranged in the positioning holes 102, so that the locking assembly can press the clamping members 101 and workpieces 200 in the stacking direction to clamp the workpieces 200 in position.

In this way, a plurality of frame-shaped workpieces 200 can be firmly fixed in position with the fixture 100 according to embodiments of the present disclosure. As a result, on the one hand, the clamped workpieces 200 can be processed, e.g., ground at a time, to thereby significantly improve the processing efficiency of the frame-shaped workpieces 200. On the other hand, the majority parts of the grinding tool can participate in the grinding, thereby avoiding the waste of the grinding tool and improving the utilization rate of the grinding tools. In addition, the plurality of workpieces 200 are ground at a time, to thereby improve the grinding consistency and quality of the workpieces.

In some embodiments, the locking assembly may comprise a locking pole 1021 and a fastener. In some embodiments, the locking pole 1021 may be located on the worktable where the workpieces 200 will be ground. For example, after the workpieces 200 are aligned to each other with the limiting gauge 104 as shown in FIG. 4, the workpieces 200 may then be moved to the worktable to allow the locking pole 1021 to pass through the positioning holes 102. After that, the limiting gauge 104 can be removed and a fastener may then be coupled to an end of the locking pole 1021 to allow the clamping members 101 and workpieces 200 to be pressed in the stacking direction. In this way, a plurality of frame-shaped workpieces 200 can be aligned and fixed in position and ready for grinding in a simple way.

It is to be understood that the above embodiments where the workpieces 200 are moved to allow the locking pole 1021 to pass through the position holes 102 are merely illustrative, without suggesting any limitation as to the scope of the present disclosure. Any other suitable method is also possible. For example, in some alternative embodiments, The clamping members 101 and the workpieces 200 are already stacked alternately on the worktable. Thus, to allow the locking pole 1021 to pass through the position holes 102, the locking pole 1021 may be moved for example by a robot.

In other aspects, embodiments of the present disclosure provide a method of clamping a plurality of frame-shaped workpieces 200. The method can be performed by at least one processing unit of a robot for example by programming the method into instructions stored in at least one memory. The robot comprises one or more end effectors for operating the fixture 100 and workpieces 200 and for processing, e.g., grinding the clamped workpieces 200. Of course, the method may also be performed by any dedicated processor independent of the processing unit of the robot. In the followings, the concept of the present disclosure will be discussed by taking the method being performed by the processing unit of the robot for clamping and processing the workpieces 200.

Figure 7:
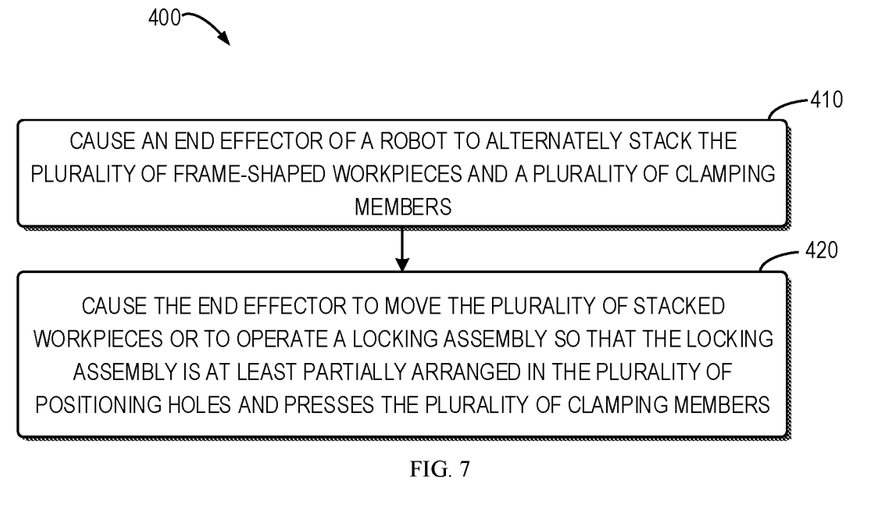
FIG. 7 shows a flowchart of a method of clamping a plurality of frame-shaped workpieces according to embodiments of the present disclosure.

FIG. 7 shows a flowchart of the method of clamping a plurality of frame-shaped workpieces 200. As shown in FIG. 7, in block 410, the robot controls the end effector to alternately operate the workpieces 200 and the clamping members 101, so that the workpieces 200 and the clamping members 101 are alternately stacked in the stacking direction. Then in block 420, the robot controls the end effector to move the stacked workpieces 200 or to operate the locking assembly to allow the locking assembly to be partially arranged in the positioning holes 102 and to press the clamping members 101 in the stacking direction. In this way, the workpieces 200 can be fixed on the worktable in position automatically with the robot. The robot can then control the end effector to process, e.g., grind side surfaces of the workpieces 200. In this way, a plurality of frame-shaped workpieces 200 can be clamped and processed in an efficient way.

In some embodiment, moving the stacked workpieces 200 or to operate the locking assembly may comprise the robot causing the end effector to move the stacked workpieces 200 or to move the locking pole 1021 so that the locking pole 1021 may pass through the positioning holes 102. After that, the end effector may then be controlled to couple a fastener to the end of the locking pole 1021 to fix the workpiece in position.

In some embodiments, the robots may also cause the end effector to allow the guiding poles 1031 to pass through guiding holes 103. This step may be achieved in the same time as the workpieces 200 and the clamping members 101 being alternately stacked. That is, the robots may cause the end effector to alternately operate the workpieces 200 and the clamping members 101 so that the workpieces 200 and the clamping members 101 are stacked alternately with the guiding pole passing through the guiding holes 103.

After that and before the workpieces 200 are fixed, the robot may then cause the end effector to move the limiting gauge 104 to abut against two sides of the stacked workpieces 200 to align the workpieces 200 in the stacking direction. In this way, the workpieces 200 can be well aligned in the stacking direction and then can be fixed with the locking assembly.

In some embodiments, after the workpieces 200 have been processed, e.g., ground, the robot may also cause the end effector to remove the locking assembly and allow the workpieces to be removed from the fixture. For example, after the locking assembly is removed, the robot may then causes the end effector to operate the clamping members 101 and the workpieces 200 alternately to release the workpieces. In this way, the whole processes of processing the frame-shaped workpieces 200 at a time can be automatically done with a robot, to thereby significantly improve the processing efficiency and quality of the frame-shaped workpieces 200.

Furthermore, in some embodiments, a robot for processing the workpieces 200 may be equipped with more than one fixture 100 as mentioned above. During processing of the workpieces 200 clamped on one fixture 100, other workpieces to be processed may be clamped on other fixtures 100. In this way, it can further save the time of clamping the workpieces before the processing of the workpieces, to thereby further improve the processing efficiency of the workpieces 200.

It should be appreciated that the above detailed embodiments of the present disclosure are only for exemplifying or explaining principles of the present disclosure and do not limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A fixture for clamping a plurality of frame-shaped workpieces, comprising: a plurality of clamping members adapted to be alternately stacked with the plurality of frame-shaped workpieces in a stacking direction; wherein the plurality of clamping members comprise: at least one intermediate clamping member comprising: a spacing plate adapted to space apart adjacent two of the plurality of frame-shaped workpieces; and a pair of limiting protrusions, wherein a first protrusion of the pair of limiting protrusions protrudes from a first side of the spacing plate; wherein a second protrusion of the pair of limiting protrusions protrudes from a second side of the spacing plate; wherein the first side is opposite the second side in the stacking direction; wherein the first of the pair of limiting protrusions and the second of the pair of limiting protrusions are adapted to be arranged inside one of the plurality of frame-shaped workpieces to limit movement of the frame-shaped workpiece; wherein each limiting protrusion of the pair of limiting protrusions has a size slightly smaller than an inner size of a frame shaped workpiece of the plurality of frame shaped workpieces in a transverse direction: wherein each limiting protrusion of the pair of limiting protrusions has a height smaller than half of a height of a frame shaped workpiece of the plurality of frame shaped workpieces: a plurality of positioning holes formed through the plurality of clamping members and aligned to each other in the stacking direction; a locking assembly at least partially arranged in the plurality of positioning holes and adapted to press the plurality of clamping members in the stacking direction to allow the plurality of clamping members to be clamped in position; and a limiting gauge with an L-shape and adapted to abut against two sides of the plurality of frame-shaped workpieces to align the plurality of frame-shaped workpieces in the stacking direction, wherein the limiting gauge has a height in the stacking direction that is larger than or equal to a distance of two of the plurality of frame-shaped workpieces in the stacking direction.

2. The fixture of claim 1, wherein the plurality of clamping members further comprise:
a pair of end clamping members arranged at two ends of the stacked clamping members in the stacking direction, and each comprising:
an end plate; and
an end limiting protrusion protruding from a side of the end plate in the stacking direction to limit movement of the frame-shaped workpiece.

3. The fixture of claim 1, wherein the locking assembly comprises:
a locking pole adapted to pass through the plurality of positioning holes; and
a fastener coupled to an end of the locking pole to allow the plurality of clamping members to be pressed.

4. The fixture of claim 1, further comprising:
a plurality of guiding holes arranged in pairs through the plurality of clamping members and adapted for a pair of guiding poles to pass through.

5. A method of clamping a plurality of frame-shaped workpieces, comprising: causing an end effector of a robot to alternately stack the plurality of frame-shaped workpieces and a plurality of clamping members; wherein the plurality of clamping members comprise: at least one intermediate clamping member comprising: a spacing plate adapted to space apart adjacent two of the plurality of frame-shaped workpieces; and a pair of limiting protrusions, wherein a first protrusion of the pair of limiting protrusions protrudes from a first side of the spacing plate; wherein a second protrusion of the pair of limiting protrusions protrudes from a second side of the spacing plate; wherein the first side is opposite the second side in a stacking direction; wherein the first of the pair of limiting protrusions and the second of the pair of limiting protrusions are adapted to be arranged inside one of the plurality of frame-shaped workpieces to limit movement of the frame-shaped workpiece; wherein each limiting protrusion of the pair of limiting protrusions has a size slightly smaller than an inner size of a frame shaped workpiece of the plurality of frame shaped workpieces in a transverse direction; wherein each limiting protrusion of the pair of limiting protrusions has a height smaller than half of a height of a frame shaped workpiece of the plurality of frame shaped workpieces; a plurality of positioning holes formed through the plurality of clamping members and aligned to each other in the stacking direction; causing the end effector to move the plurality of stacked workpieces or to operate a locking assembly so that the locking assembly is at least partially arranged in the plurality of positioning holes and presses the plurality of clamping members in the stacking direction to allow the plurality of clamping members to be fixed in position; and before the plurality of stacked workpieces are fixed, causing the end effector to move a limiting gauge to abut against two sides of the plurality of frame-shaped workpieces to align the plurality of frame-shaped workpieces in the stacking direction, wherein the limiting gauge has an L-shape and a height in the stacking direction that is larger than or equal to a distance of two of the plurality of frame-shaped workpieces in the stacking direction.

6. The method of claim 5, wherein causing the end effector to move the plurality of stacked workpieces or to operate the locking assembly comprises:
   causing the end effector to move the plurality of stacked workpieces or to operate the locking assembly so that a locking pole of the locking assembly passes through a plurality of positioning holes; and
   causing the end effector to couple a fastener to the locking pole to clamp the plurality of clamping members in position.

7. The method of claim 5, wherein alternately stacking the plurality of frame-shaped workpieces and the plurality of clamping members further comprises:
   causing the end effector to alternately operate the plurality of frame-shaped workpieces and the plurality of clamping members to allow a pair of guiding poles to pass through a plurality of guiding holes arranged in pairs through the plurality of clamping members.

* * * * *